United States Patent
Zhang et al.

(10) Patent No.: US 9,644,295 B2
(45) Date of Patent: May 9, 2017

(54) CENTRIFUGAL ELECTROSPINNING APPARATUS AND METHODS AND FIBROUS STRUCTURES PRODUCED THEREFROM

(71) Applicant: University of Washington through its Center for Commercialization, Seattle, WA (US)

(72) Inventors: Miqin Zhang, Bothell, WA (US); Ashleigh Cooper, Gainesville, FL (US); Dennis Edmondson, Marysville, WA (US)

(73) Assignee: University of Washington through its Center for Commercialization, Seattle, WA (US)

( * ) Notice: Subject to any disclaimer, the term of this patent is extended or adjusted under 35 U.S.C. 154(b) by 551 days.

(21) Appl. No.: 13/969,389

(22) Filed: Aug. 16, 2013

(65) Prior Publication Data

US 2014/0051316 A1    Feb. 20, 2014

Related U.S. Application Data

(60) Provisional application No. 61/684,078, filed on Aug. 16, 2012.

(51) Int. Cl.
*D04H 1/74* (2006.01)
*B29D 99/00* (2010.01)
*D01D 5/00* (2006.01)
*D01D 5/18* (2006.01)
*D04H 1/728* (2012.01)

(52) U.S. Cl.
CPC .......... *D04H 1/74* (2013.01); *B29D 99/0078* (2013.01); *D01D 5/0061* (2013.01); *D01D 5/0076* (2013.01); *D01D 5/18* (2013.01); *D04H 1/728* (2013.01); *Y10T 442/681* (2015.04)

(58) Field of Classification Search
USPC ............. 264/465; 442/401; 425/0.174, 0.8 E
See application file for complete search history.

(56) References Cited

U.S. PATENT DOCUMENTS

| | | | |
|---|---|---|---|
| 8,211,352 B2 | 7/2012 | Baca | |
| 8,342,831 B2 * | 1/2013 | Barinov | D01D 5/0092 425/135 |
| 2009/0102100 A1 | 4/2009 | Hellring | |
| 2010/0148404 A1 * | 6/2010 | Smida | D01D 5/0069 264/465 |

OTHER PUBLICATIONS

Arinstein, A., et al., "Effect of Supramolecular Structure on Polymer Nanofibre Elasticity," Nature Nanotechnology 2(1):59-62, Jan. 2007.

Baji, A., et al., "Electrospinning of Polymer Nanofibers: Effects on Oriented Morphology, Structures and Tensile Properties," Composites Science and Technology 70(5):703-718, May 2010.

(Continued)

*Primary Examiner* — Lynda Salvatore
(74) *Attorney, Agent, or Firm* — Christensen O'Connor Johnson Kindness PLLC

(57) ABSTRACT

A centrifugal electrospinning apparatus, centrifugal electrospinning method for the production of fibrous structures, and electrospun fibrous structures are provided.

20 Claims, 13 Drawing Sheets

(56) References Cited

OTHER PUBLICATIONS

Benz, M., et al., "The Role of Solution Phase Water on the Deposition of Thin Films of Poly(vinylidene fluoride)," Macromolecules 35(7):2682-2688, Mar. 2002.

Bhardwaj, N., and S.C. Kundu, "Electrospinning: A Fascinating Fiber Fabrication Technique," Biotechnology Advances 28(3):325-347, May-Jun. 2010.

Badrossamay, M.R., et al., "Nanofiber Assembly by Rotary Jet-Spinning," Nano Letters 10(6):2257-2261, Jun. 2010.

Chang, C., et al., "Direct-Write Piezoelectric Polymeric Nanogenerator With High Energy Conversion Efficiency," Nano Letters 10(2):726-731, Feb. 2010.

Chen, X., et al., "1.6 V Nanogenerator for Mechanical Energy Harvesting Using PZT Nanofibers," Nano Letters 10(6):2133-2137, Jun. 2010.

Dabirian, F., et al., "A Comparative Study of Jet Formation and Nanofiber Alignment in Electrospinning and Electrocentrifugal Spinning Systems," Journal of Electrostatics 69(6):540-546, Dec. 2011.

Dabirian, F., et al., "Production of Uniaxially Aligned Nanofibers Using a Modified Electrospinning Method: Rotating Jet," Current Nanoscience 5(3):318-323, Aug. 2009.

Edmondson, D., et al., "Design and Evaluation of a Nanoscale Differential Tensile Device for Nanofibers," Applied Physics Letters 94(10):103101-1-103101-3, Mar. 2009.

Esterly, D.M., and B.J. Love, "Phase Transformation to β-Poly(vinylidene fluoride) by Milling," Journal of Polymer Science Part B: Polymer Physics 42(1):91-97, Jan. 2004.

Gu, F., et al., "Polymer Single-Nanowire Optical Sensors," Nano Letters 8(9):2757-2761, Sep. 2008.

Lee, S.-H., et al., "Three-Point Bending of Electrospun $TiO_2$ Nanofibers," Materials Science and Engineering: A 398(1-2):77-81, May 2005.

Li, D., et al. "Electrospinning of Polymeric and Ceramic Nanofibers as Uniaxially Aligned Arrays," Nano Letters 3(8):1167-1171, Aug. 2003.

Liu, L., and Y.A. Dzenis, "Analysis of the Effects of the Residual Charge and Gap Size on Electrospun Nanofiber Alignment in a Gap Method," Nanotechnology 19(35):355307, Sep. 2008, 7 pages.

Matthews, J.A., et al., "Electrospinning of Collagen Nanofibers," Biomacromolecules 3(2):232-238, Mar.-Apr. 2002.

Mitragotri, S., and J. Lahann, "Physical Approaches to Biomaterial Design," Nature Materials 8(1):15-23, Jan. 2009.

Nerurkar, N.L., et al., "Nanofibrous Biologic Laminates Replicate the Form and Function of the Annulus Fibrosus," Nature Materials 8(12):986-992, Dec. 2009.

O'Connell, B., "Oval Profile Plot," Feb. 15, 2002: First Version, <http://rsbweb.nih.gov/ij/plugins/oval-profile.html>, 1 page.

Reneker, D.H., et al., "Electrospinning of Nanofibers From Polymer Solutions and Melts," in E. van der Giessen and H. Aref (eds.), Advances in Applied Mechanics, Elsevier, Mar. 2007, vol. 41, pp. 43-195.

Rutledge, G.C., and S.V. Fridrikh, "Formation of Fibers by Electrospinning," Advanced Drug Delivery Reviews 59(14):1384-1391, Dec. 2007.

Secasanu, V.P., et al., "A Novel Electrospinning Target to Improve the Yield of Uniaxially Aligned Fibers," Biotechnology Progress 25(4):1169-1175, Jul.-Aug. 2009.

Senthilram, T., et al., "Self Crimped and Aligned Fibers," Materials Today 14(5):226-229, May 2011.

Sill, T.J., and H.A. Von Recum, "Electrospinning: Applications in Drug Delivery and Tissue Engineering," Biomatenals 29(13):1989-2006, May 2008.

Takahashi, Y., and H. Tadokoro, "Crystal Structure of Form III of Poly(vinylidene fluoride)," Macromolecules 13(5):1317-1318, Sep. 1980.

Tamura, T., and H. Kawakami, "Aligned Electrospun Nanofiber Composite Membranes for Fuel Cell Electrolytes," Nano Letters 10(4):1324-1328, Apr. 2010.

Teo, W.E., and S. Ramakrishna, "A Review on Electrospinning Design and Nanofibre Assemblies," Nanotechnology 17(14):R89-R106, Jul. 2006.

Thavasi, V., et al., "Electrospun Nanofibers in Energy and Environmental Applications," Energy & Environmental Science 1(2):205-221, Jan. 2008.

Theron, A., et al., "Electrostatic Field-Assisted Alignment of Electrospun Nanofibres," Nanotechnology 12(3):384-390, Aug. 2001.

Wang, C.-T., et al., "Non-Woven and Aligned Electrospun Multicomponent Luminescent Polymer Nanofibers: Effects of Aggregated Morphology on the Photophysical Properties," Nanotechnology 20(37):375604, Sep. 2009, 10 pages.

Xie, J., et al., "Neurite Outgrowth on Nanofiber Scaffolds With Different Orders, Structures, and Surface Properties," ACS Nano 3(5):1151-1159, May 2009.

Yee, W.A., et al., "Morphology, Polymorphism Behavior and Molecular Orientation of Electrospun Poly(vinylidene fluoride) Fibers," Polymer 48(2):512-521, Jan. 2007.

Zheng, J., et al., "Polymorphism Control of Poly(vinylidene fluoride) Through Electrospinning," Macromolecular Rapid Communications 28(22):2159-2162, Oct. 2007.

Edmondson, D., et al., "Centrifugal Electrospinning of Highly Aligned Polymer Nanofibers Over a Large Area," Journal of Materials Chemistry 22(35):18646-18652, Sep. 2012.

Madurantakam, P.A., et al., "Multiple Factor Interactions in Biomimetic Mineralization of Electrospun Scaffolds," Biomaterials 30(29):5456-5464, Oct. 2009.

* cited by examiner

CENTRIFUGAL ELECTROSPINNING APPARATUS AND METHODS AND FIBROUS STRUCTURES PRODUCED THEREFROM

CROSS-REFERENCE TO RELATED APPLICATION

The present application claims the benefit of U.S. Patent Application No. 61/684,078, filed Aug. 16, 2012, expressly incorporated herein by reference in its entirety.

STATEMENT OF GOVERNMENT LICENSE RIGHTS

This invention was made with Government support under Grant No. DMR-0520567 awarded by the National Science Foundation. The Government has certain rights in the invention.

BACKGROUND OF THE INVENTION

Nanoscale fibers are widely used in textile, energy, environmental and bioengineering applications as they exhibit unique optical, electrical, mechanical, and biological properties that are not found in their bulk counterparts. Some of these applications require highly ordered, well-aligned fiber architectures in order to provide the required physical, mechanical, chemical or electrical anisotropy. For example, aligned polymer fibers of various compositions are able to regulate cell migration, proliferation, and differentiation, which is critical for tissue engineering. Highly aligned polyfluorene-based nanofibers can increase charge-carrier mobility or enhance photoluminescence in the fiber alignment direction. Composite electrolyte membranes with aligned polyimide-based fibers demonstrate greater proton-conduction for enhanced fuel cell efficiency. Electrospinning has emerged as a simple, flexible, and versatile technique for creating many nanofiber-based materials.

The production of aligned nanofibers by electrospinning is commonly achieved by use of specially-designed fiber collectors, most notably, a fast rotating mandrel collector or a parallel-electrode collector. In a rotating collector configuration, the produced polymer fibers are deposited on and wrapped around a rotating mandrel. The degree of fiber alignment largely depends on the mandrel rotational speed. In a parallel-electrode configuration, the insulating gap (mostly an air gap) between two parallel electrodes serves as the fiber collector, and charged fibers are aligned up across the gap by the electric field near the electrodes that points perpendicularly to the electrode edges; the length of the aligned fibers is limited by the width of the insulating gap. This configuration bears the advantage that the fibers can be easily removed from the collector, but the degree of fiber alignment decreases as the thickness of the fibrous mat increases due to the reduced electric field strength caused by the accumulated charge of the deposited nanofibers. In this system configuration, a centrifugal force disperses a polymer-solvent solution through a capillary, which causes elongation and thinning of the solution jet, and the fiber is produced with no applied voltage.

Despite these exciting advancements, an electro spinning system that is suitable for large-scale production of fibrous structures while retaining a high degree of fiber alignment has yet to be demonstrated. The present invention seeks to fulfill this need and provides further related advantages.

SUMMARY OF THE INVENTION

The present invention provides a centrifugal electrospinning (CE) system that integrates the concepts of the parallel-electrode method with centrifugal dispersion to produce fibrous structures having a high degree of alignment and uniformity of fibers over a large area. The present invention provides an electrospinning apparatus that is useful for making fibrous structures, methods for making fibrous structures, and fibrous structures that are made by the methods of the invention.

In one aspect of the invention, an electrospinning apparatus is provided. In one embodiment, the apparatus includes a nozzle configured to expel an electrospinning solution through a conductive tip to produce electrospun fibers; a rotator configured to rotate the tip through a rotation plane; and a plurality of deposition electrodes arranged in the rotation plane and configured to receive the electrospun fibers. In another embodiment, the electrospinning apparatus includes a nozzle configured to expel an electrospinning solution through a conductive tip to produce electrospun fibers; a plurality of deposition electrodes arranged in the rotation plane and configured to receive the electrospun fibers; and a rotator configured to rotate the plurality of deposition electrodes through a rotation plane.

In another aspect, the invention provides methods for making a fibrous structure. In one embodiment, the method includes expelling an electrospinning solution through a rotating conductive tip to produce electrospun fibers, wherein the tip rotates through a rotation plane; and receiving the electrospun fibers on a plurality of deposition electrodes arranged in the rotation plane to provide a fibrous structure. In another embodiment, the method includes expelling an electrospinning solution through a conductive tip to produce electrospun fibers, and receiving the electrospun fibers on a plurality of deposition electrodes arranged in a rotation plane to provide a fibrous structure, wherein the plurality of deposition electrodes rotates through the rotation plane. In certain embodiments, the electrospinning solution comprises a polymer such as a synthetic polymer or a natural polymer. In other embodiments, the electrospinning solution comprises a ceramic. In further embodiments, the electrospinning solution comprises a combination of one or more polymers and one or more ceramics. Each of the electrospinning solutions can further include an active material to provide composite electrospun fibers and fibrous structures in which the active material imparts additional functionality to the structure.

In a further aspect, the invention provides a fibrous structure produced by the methods of the invention. In certain embodiments, the fibrous structure is produced by the apparatus of the invention. In one embodiment, the fibrous structure includes fibers having a degree of alignment that is at least 1:1 (peak height: peak width at half maximum). In other embodiments, the degree of fiber alignment is greater than or about 2:1, greater than or about 3:1, greater than or about 4:1, greater than or about 5:1, greater than or about 6:1, greater than or about 7:1, greater than or about 8:1, greater than or about 9:1, greater than or about 10:1, or greater than or about 20:1. In certain embodiments, the fibrous structure includes polymer fibers. In other embodiments, the fibrous structure includes ceramic fibers. In further embodiments, the fibrous structure includes fibers that are electrospun from a composition that includes a combination of one or more polymers and one or more ceramic materials. The fibrous structure can further include one or more active materials to impart functionality to the electrospun fiber and the fibrous structure.

DESCRIPTION OF THE DRAWINGS

The foregoing aspects and many of the attendant advantages of this invention will become more readily appreciated as the same become better understood by reference to the following detailed description, when taken in conjunction with the accompanying drawings.

FIG. 1A is a schematic top plan view of an electrospinning apparatus in accordance with the disclosed embodiments. FIG. 1B is a schematic side elevation view of an electrospinning apparatus in accordance with the disclosed embodiments.

FIG. 1C is a schematic top plan view of an electrospinning apparatus in accordance with the disclosed embodiments. FIG. 1D is a schematic side elevation view of an electrospinning apparatus in accordance with the disclosed embodiments.

FIG. 3D shows arbitrary pixel intensity plotted from the radial summation of pixel intensity from the FFT analysis.

FIG. 4E compares size distribution of electrospun PVDF fibers as function of polymer concentration. The error bars indicate the largest and smallest fiber diameter measured from a dataset of 50 fibers.

FIG. 6A is a schematic illustration of the system employed to test the piezoelectric effect of PVDF fibers. Aligned fibers electrospun at 200 rpm, randomly-oriented fibers (FIG. 6B) and stationary spinneret-spun (parallel-electrode) fibers (FIG. 6C), all 25 mm in length were cast in PDMS, connected to electrodes, fixed via a clamp at one end and deflected at the opposite cantilever end. FIG. 6D compares the measured piezoelectric voltage output of fibers produced by the various fibrous systems (n=3 per fibrous system). FIG. 6E illustrates the XRD analysis of the PVDF with designated $\alpha$-, $\beta$-, and $\gamma$-phases peak locations.

DETAILED DESCRIPTION OF THE INVENTION

The present invention provides a centrifugal electrospinning (CE) system that integrates the concepts of the parallel-electrode method with centrifugal dispersion to produce fibrous structures having a high degree of alignment and uniformity of fibers over a large area. The present invention provides an electrospinning apparatus that is useful for making fibrous structures, methods for making fibrous structures, and fibrous structures that are made by the methods of the invention.

The apparatus and methods of the invention produce a fibrous structure comprised of electrospun fibers. In certain embodiments, the electrospun fibers have nanoscale dimensions and are nanofibers, and the fibrous structures produced by the apparatus and method comprising nano scale fibers are nanofibrous structures. In other embodiments, the electrospun fibers have dimensions greater than nanoscale dimensions (i.e., microscale dimensions). As used herein, the terms "fibers" and "fibrous structures" refer to electrospun fibers and structures that include the electrospun fibers produced by the apparatus and methods of the invention. As used herein, the term "fibers" is inclusive of nanofibers and the term "fibrous structures" is inclusive of nanofibrous structures.

In one aspect of the invention, an electrospinning apparatus is provided. In another aspect, the invention provides an electrospinning method for the production of a fibrous structure. In a further aspect of the invention, electrospun fibrous structures are provided.

Electro Spinning Apparatus

In one aspect, an electrospinning apparatus is provided. In one embodiment, the electrospinning apparatus includes a nozzle configured to expel an electrospinning solution through a conductive tip to produce electrospun fibers; a rotator configured to rotate the tip through a rotation plane; and a plurality of deposition electrodes arranged in the rotation plane and configured to receive the electrospun fibers.

Figure 1A:
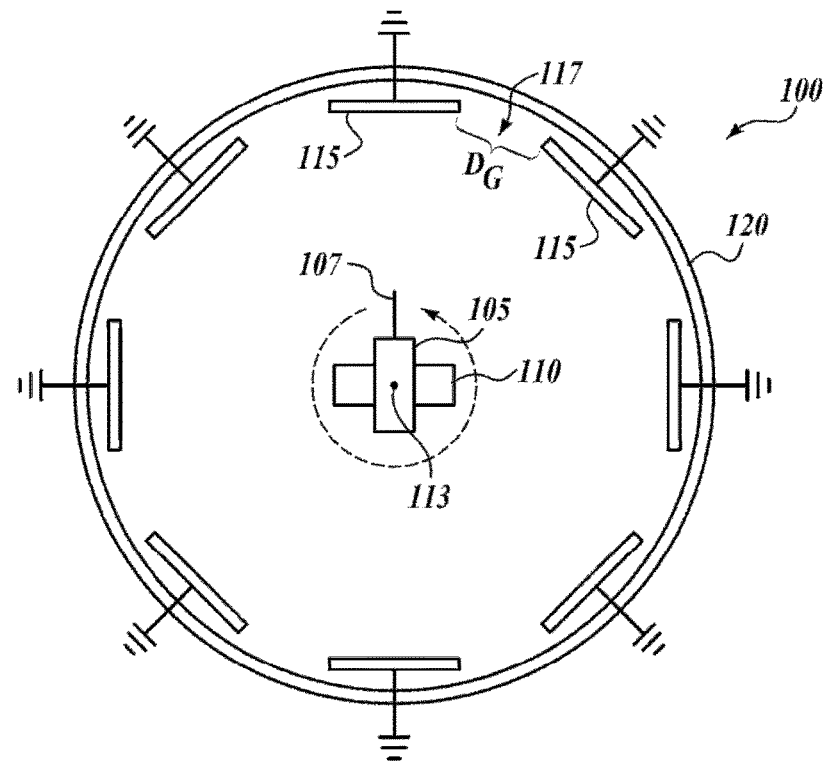
FIGS. 1A and 1B are schematic illustrations of a representative centrifugal electrospinning (CE) system of the invention for large-area production of aligned polymer fibers.
Figure 1B:
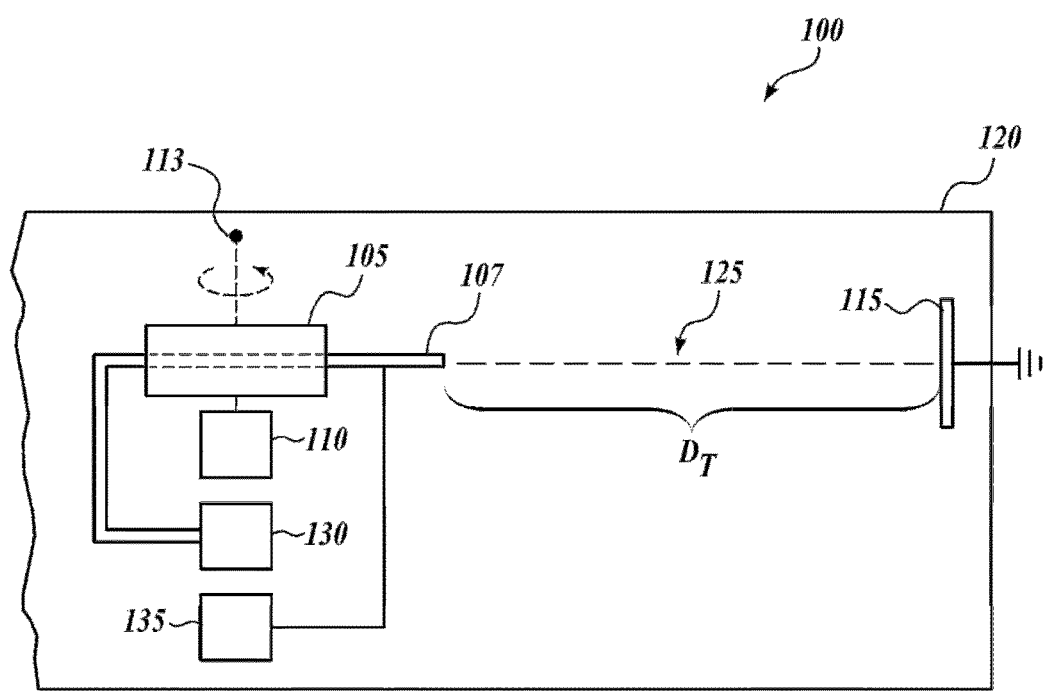

Referring to FIGS. 1A and 1B, an electrospinning apparatus 100 is illustrated. The electrospinning apparatus 100 includes a rotatable nozzle 105 configured to expel an electrospinning solution through a conductive tip 107, towards a plurality of deposition electrodes 115, to produce electrospun fibers. The centrifugal force created by the rotation of the nozzle 105 produces highly aligned electrospun fibers deposited on the deposition electrodes 115 and in insulating gaps 117 separating the deposition electrodes 115.

The design of the nozzle 105 and conductive tip 107 can be any configurations known to those of skill in the art, as long as the electrospinning solution can be expelled from the conductive tip 107 at a sufficient quantity and velocity to produce aligned electrospun fibers. The nozzle 105 and conductive tip 107 can be monolithic in construction, or can be separate parts, as illustrated in FIGS. 1A and 1B. The term "spinneret" is sometimes used to describe the nozzle 105 and conductive tip 107.

In one embodiment, the electrospinning solution is provided to the nozzle 105 and the conductive tip 107 by a reservoir 130, which is illustrated schematically in FIG. 1B in liquid communication with the conductive tip 107 by passing through the nozzle 105. Not illustrated is a pressure source, which may be integrated into the reservoir 130, the nozzle 105, or any location within the electrospinning apparatus 100, so as to provide liquid pressure to the electrospinning solution sufficient to expel it from the conductive tip 107 to form electrospun fibers.

The conductive tip 107 is made of a conductive material and allows the passage of the electrospinning solution from the nozzle 105, through the conductive tip 107, and toward the plurality of deposition electrodes 115 onto which the electrospun fibers are deposited. The materials and configuration of the conductive tip 107 can be those known to skill in the art, so long as the design of the conductive tip 107 is sufficient to effect deposition of the electrospun fibers in accordance with the provided embodiments. Representative conductive tip 107 materials include conductive polymers such as polyaniline, glycidyl-aide polymer, DERIN, polyacetylene, polypyrrole, polyphenylene sulfide, and metals/metal coatings such as stainless steel, titanium, copper, and brass.

The conductive tip 107 is held at an electric potential different than that of the deposition electrodes 115, so as to cause electrospinning to occur when the electrospinning solution is expelled from the conductive tip 107. The basic principles of electrospinning (without the disclosed rotational embodiments) are known to those of skill in the art and will not be described in detail. In one embodiment, a power supply 135 is in electronic communication with the conductive tip 107 so as to apply a first voltage to the conductive tip 107. In certain embodiments, the power supply 135 applies a voltage of from about 1 kV DC to about 30 kV volts DC.

In the embodiments illustrated in FIGS. 1A and 1B, the deposition electrodes 115 are attached to ground, although it will be appreciated that in other embodiments, the conductive tip 107 and deposition electrodes 115 are in electronic communication such that a voltage is applied across the conductive tip 107 and deposition electrodes 115.

The deposition electrodes 115 can be any conductive material known to those of skill in the art. Representative deposition electrode 115 materials include metals and alloys such as aluminum, chromium, silver, copper, magnesium, bronze, titanium, nickel stainless steel, brass, and bronze.

The conductive tip 107 and deposition electrodes 115 are separated by a "tip-to-electrode" distance labeled $D_T$ in FIG. 1B. In one embodiment, the plurality of deposition electrodes 115, are arranged concentrically such that $D_T$ is uniform for each deposition electrode 115 in the electrospinning apparatus 100. In one embodiment, $D_T$ is from about 1 cm to about 24 cm.

The electrospinning apparatus 100 operates by rotating the nozzle 105 and conductive tip 107 using a rotator 110 for rotation around a rotation axis 113. In one embodiment, the plurality of deposition electrodes 115 are arranged concentrically surrounding the rotation axis. The rotator 110 can be any mechanical rotation mechanism known to those of skill in the art, such as a motor having a shaft extending along the rotation axis 113 and connecting the nozzle 105 so as to provide rotation to the nozzle 105 and conductive tip 107. The electrospinning apparatus 100 is configured such that the conductive tip 107 is rotated in a rotation plane 125 that passes through the conductive tip as well as the deposition electrodes 115 throughout the rotation of the conductive tip around the rotation axis 113.

In one embodiment, the rotator 110 is configured to rotate the conductive tip through the rotation plane 125 at a rate of about 50 to 1000 rpm.

The deposition electrodes 115 are arranged in the rotation plane 125 and configured to receive the electrospun fibers produced by expelling the electrospinning solution from the conductive tip 107 when a voltage is applied to the conductive tip 107. As used herein, the term "configured to receive the electrospun fibers" refers to the presence of a deposition electrode 115 on the rotation plane as the conductive tip 107 rotates around the rotation axis 113 such that electrospun fibers are deposited on the deposition electrodes 115. In the embodiments illustrated in FIGS. 1A and 1B, the deposition electrodes 115 are normal to the rotation plane 125. While this is an illustrative embodiment, it will be appreciated that the deposition electrodes 115 can be held at any angle relative to the rotation plane 125 as long as the electrospun fibers can be deposited onto the deposition electrodes 115.

In certain embodiments, the deposition electrodes 115 are arranged and configured in a parallel-electrode electrospinning configuration. Parallel-electrode electrospinning, in general, is known to those of skill in the art as an electrospinning configuration wherein two parallel conducting electrodes are disposed in the path of the electrospun fiber so as to deposit the electrospun fibers in a non-conducting gap between the electrodes. Accordingly, in one embodiment, the plurality of deposition electrodes 115 are separated by insulating gaps 117. The insulating gaps 117 separate the deposition electrodes 115 by a distance indicated in FIG. 1A as $D_G$. In one embodiment, the insulating gaps are from about 1 to about 80 cm. When electrospun fibers are deposited during rotation according to the provided electrospinning apparatus 100, the electrospun fibers are deposited both on the deposition electrodes 115 as well as across the insulating gaps 117 separating the deposition electrodes 115. The deposited electrospun fibers are highly aligned.

Electrospun highly aligned fiber films can be produced by the electrospinning apparatus 100 by rotating the conductive tip 107 around the rotation axis 113 along the rotation plane 125 while expelling the electrospinning solution. Sufficient rotation, as well as traditional electrospinning considerations (e.g., voltage, $D_T$, electrospinning solution type, and expelling pressure at the conductive tip 107) all factor into the characteristics of the deposited electrospun fiber, including the degree to which the fibers are aligned.

The highly aligned fibers can be utilized or harvested by collecting fibers horizontally or vertically on desired substrates or devices.

In one embodiment, the electrospinning apparatus 100 further includes a non-conducting housing 120 enclosing the nozzle 105, the rotator 110, and the plurality of deposition electrodes 115. The non-conducting housing 120 protects the electrospinning apparatus 100 from disturbances, as well as protects users from the high voltages sometimes used during the electrospinning process. Representative housing materials include non-conducting housing materials that can be insulators such as polyimide, plastic, wood, plexiglass, poly(methyl methacrylate), and acrylics.

In another embodiment, the electrospinning apparatus includes a nozzle configured to expel an electrospinning solution through a conductive tip to produce electrospun fibers; a plurality of deposition electrodes arranged in the rotation plane and configured to receive the electrospun fibers; and a rotator configured to rotate the plurality of deposition electrodes through a rotation plane. This embodiment is referred to herein as the "rotating electrode" electrospinning apparatus.

Figure 1C:
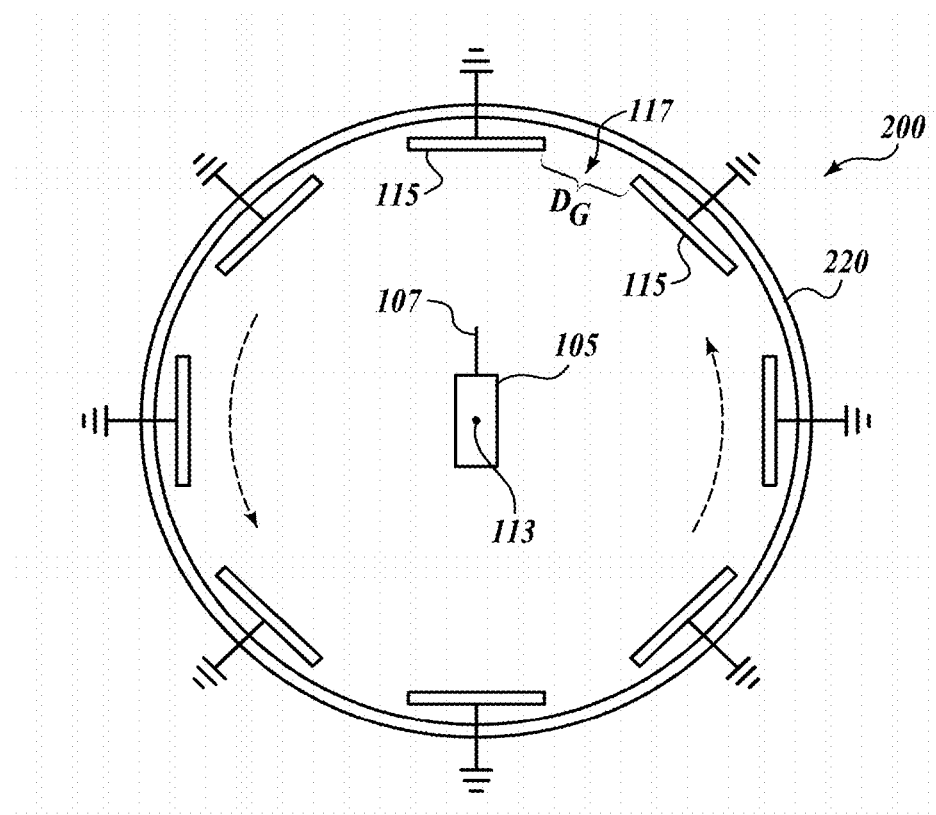
FIGS. 1C and 1D are schematic illustrations of another representative centrifugal electrospinning (CE) system of the invention for large-area production of aligned polymer fibers.
Figure 1D:
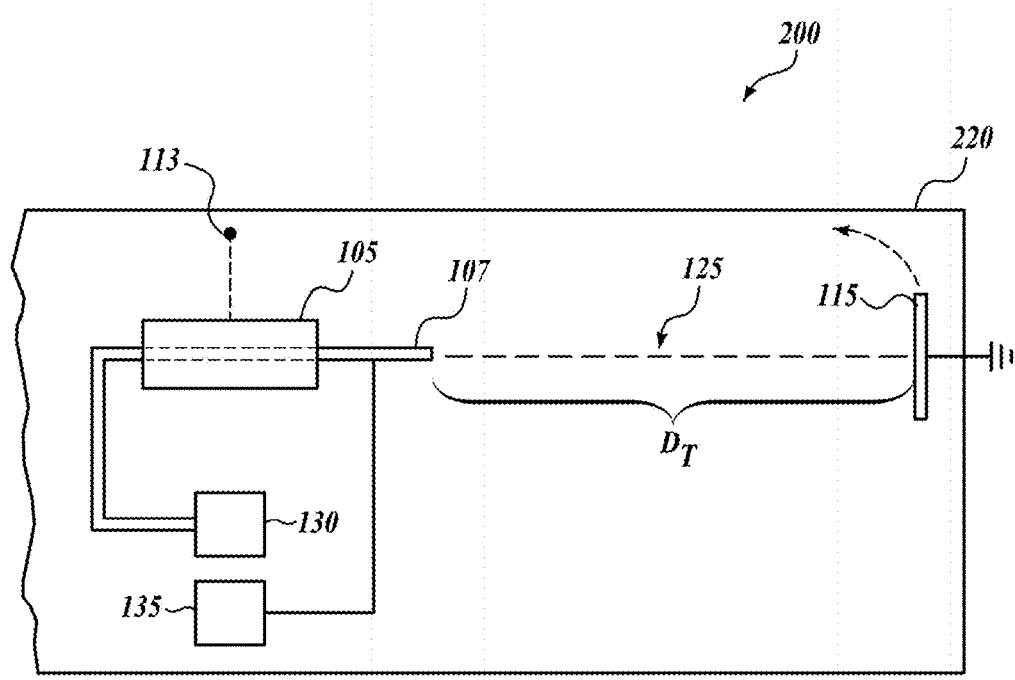
Figure 1E:
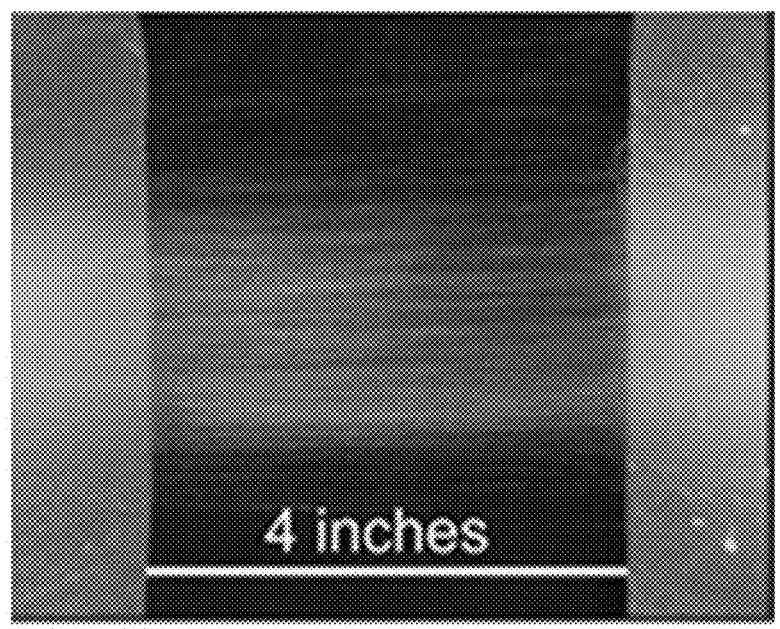
FIG. 1E illustrates electrospun PVDF fibers deposited across a four-inch gap between two grounded electrodes.

FIGS. 1C and 1D are schematic illustrations of the rotating electrode electrospinning apparatus. The rotating electrode electrospinning apparatus 200 is similar in almost all aspects to the "rotating nozzle" electrospinning apparatus 100 illustrated in FIGS. 1A and 1B. Accordingly, only notable differences will be discussed. The electrospinning apparatus 200 does not include a rotator 110 attached to the nozzle 105, because the nozzle 105 remains stationary during operation. Instead, the plurality of deposition electrodes 115 are rotated around the nozzle 105 in order to provide the rotation required between the nozzle 105 and deposition electrodes 115 in order to produce aligned electrospun fibers. The rotation of the plurality of deposition electrodes 115 is around the rotation axis 113 and the plurality of deposition electrodes 115 rotate along the rotation plane 125. The rotation of the plurality of deposition electrodes 115 can be effected by any rotating mechanism known to those of skill in the art. In the illustrated embodiments, a non-conducting housing 220 is configured to rotate, which in turn rotates the plurality of deposition electrodes 115 mounted to the non-conducing house 220.

It will be appreciated from the discussion above regarding the embodiments of FIGS. 1A-1D that the embodiments disclosed herein produce highly aligned electrospun fibers by rotating the nozzle 105 in relation to the plurality of deposition electrodes 115. Therefore, any electrospinning apparatus configured to provide such rotation is contemplated, including embodiments where both the nozzle 105 and the plurality of deposition electrodes 115 are rotated simultaneously, in the same or opposite directions.

Methods for Electrospinning Fibrous Structures

In another aspect, the invention provides methods for making fibrous structures by centrifugal electrospinning. In one embodiment, the methods includes expelling an electrospinning solution through a rotating conductive tip to produce electrospun fibers, wherein the tip rotates through a rotation plane; and receiving the electrospun fibers on a plurality of deposition electrodes arranged in the rotation plane to provide a fibrous structure. In another embodiment, the methods includes expelling an electrospinning solution through a conductive tip to produce electrospun fibers, and receiving the electrospun fibers on a plurality of deposition electrodes arranged in a rotation plane to provide a fibrous structure, wherein the plurality of deposition electrodes rotates through the rotation plane.

The fibrous structures produced by the method can include fibers that are aligned to varying degrees from highly aligned to slightly aligned. The fibrous structures produced by the method can include fibers that are randomly aligned. The fibrous structures produced by the method can include fibers that are crosslinked fibers, crosshatched fibers, porous fibers, and core-shell fibers. The fibrous structure can be in the form of a fibrous mat. Fibrous structures can be produced by the method to have a variety of thicknesses.

The method of the invention, as well as the electrospinning device describe herein, can produce fibrous nanostructures from any compositions that can be electrospun to produce a fiber. Suitable compositions include those known in the art. The compositions to be electrospun are electrospinning solutions that include, for example, polymers, ceramics, and composites that are combinations of polymers and ceramics. The compositions and electrospinning solutions can further include one or more active materials that imparts functionality to the electrospun fiber.

In one embodiment, the electrospinning solution includes a polymer and the electrospun fiber is a polymer fiber. Suitable polymers include any polymer that can be electrospun. As used herein, the "polymer" refers to any material formed by polymerization and includes homopolymers and copolymers (e.g., random, block, graft). Suitable polymers include synthetic polymers and natural polymers. Mixture of synthetic polymers and natural polymers can also suitable for electrospinning to provide the fibrous structures of the invention. The electrospinning solution may include one or more polymers to provide fibrous structures having fibers comprising more than one polymer type. Representative synthetic polymers include polyvinylidene fluorides (PVDF), polyethylenes (PE), polyvinyl alcohols, nylon6,6, polyurethanes, polycarbonates, polyacrylonitriles, polyacrylates, polyethylene oxides (PEO), polystyrenes, polyamides, polymethacrylates, polycaprolactones (PCL), poly(lactic-co-glycolic acid)s (PLGA). Representative natural polymers include chitosans, alginates, collagens, silk proteins, cellulose acetates. To improve the electrospinning of certain polymers (e.g., natural polymer), the polymers can be mixed with polyethylene oxide.

In another embodiment, the electrospinning solution includes a ceramic and the electrospun fiber is a ceramic fiber. Suitable ceramics include any ceramic material that can be electrospun. Electrospinnable ceramic materials are known in the art. Suitable ceramics include metal oxides. Representative ceramic materials include $ZnO$, $TiO_2$, $SiO_2$, $Al_2O_3$, $SnO_2$, $CuO$, $NiO$, $Fe_2O_3$, $BaTiO_3$, $LaMnO_3$, $NiFe_2O_4$, and $GaN$.

As noted above, the electrospinning solution can include a combination of one or more polymers and one or more ceramics to provide a fibrous structure in which the fibers are composite fibers (i.e., a combination of polymer and ceramic, and optionally active material). Representative composite fibers and fibrous structures produced by the method of the invention include chitosan-PCL, collagen-PEO, chitosan-PEO, polyacrylnitrile-$TiO_2$, chitosan-$ZnO_2$, PCL-ZnO, silk protein-PEO.

The electrospinning solutions include a material to be electrospun (e.g., one or more polymers, one or more ceramics, combinations of polymers and ceramics, optionally including one or more active materials) and a solvent. Suitable solvents include solvents that are relatively volatile solvents such as ethanol, water, isopropanol, chloroform, and dimethylformamide. Representative polymer solutions include chitosan in acetic acid or trifluoroacetic acid, poly (vinyl alcohol) in water, PVDF in dimethylformamide, alginate in water, and PCL in trifluoroethanol.

In certain embodiments, the electrospinning solutions further include can an active material that imparts functionality to the electrospun fibers and the fibrous structure of the invention. Active materials are known in the art. Suitable active materials are active materials that can be electrospun. Representative active materials include, for example, tetrafluorobutylammonium chloride in PVDF to increase PVDF piezoelectric properties, $BaTiO_3$ in PVDF to improve PVDF piezoelectric properties, collagen in PCL to improve PCL biofunctionality, chitosan in PCL to reduce bacteria adhesion to PCL, and ceramics in polymer fibers to increase mechanical properties.

In certain embodiments of the method, expelling the electrospinning solution through the rotating conductive tip to produce electrospun fibers comprises applying a first voltage to the conductive tip. The first voltage can be varied from about 1 to about 30 kV DC. In certain embodiments, the tip is configured to rotate at from about 50 to 1000 rpm.

In certain embodiments, the plurality of deposition electrodes are arranged concentrically around the tip and are separated by insulating gaps. Each of the plurality of deposition electrodes is at a potential less than that of the spinneret (e.g., ground or close to ground). In certain embodiments, the plurality of deposition electrodes are from about 1 to 24 cm from the conductive tip. In certain embodiments, the gap between each electrode of the plurality of deposition electrodes is from about 1 to 80 cm.

Fibrous Structure

In a further aspect of the invention, fibrous structures are provided. The fibrous structures include fibers electrospun in accordance with the method of the invention. In certain embodiments, the fibrous structures include fibers electrospun by the apparatus of the invention. As noted above, the fibrous structures can include fibers that are aligned to varying degrees from highly aligned to slightly aligned, fibers that are randomly aligned, fibers that are crosslinked fibers, fibers that are crosshatched fibers, fibers that are porous fibers, and fibers that are core-shell fibers. The electrospun fibers of the structure can have a diameter from about 50 to about 2000 nm. In certain embodiments, the fibers have a diameter from about 100 to 1000 nm. In other embodiments, the fibers have a diameter from about 200 to 500 nm.

The fibrous structure can be in the form of a fibrous mat. Fibrous structures can be produced by the method to have a variety of lengths, widths, and thicknesses. The fibrous structure can have a length from about 1 mm to about 20 cm, a width from about 1 mm to about 80 cm, and a thickness from about 20 nm to about 1 cm. Therefore, the area and volume of the fibrous structure of the invention can be greatly varied.

In certain embodiments, the fibrous structure includes fibers that are polymer fibers. In other embodiments, the fibrous structure includes fibers that are ceramic fibers. In further embodiments, the fibrous structure includes fibers that are electrospun from a composition that includes a combination of one or more polymers and one or more ceramic materials. As noted above, the fibrous structure can further include one or more active materials to impart functionality to the electrospun fiber and ultimately the fibrous structure. Suitable and representative polymers, ceramic materials, and active materials for the fibrous nanostructure are as described above.

In certain embodiments, the electrospun fibrous structure of the invention includes aligned fibers. The measure or degree of alignment is determined as described in detail below. Briefly, the degree of alignment is determined by a multistep process: obtain an image of the fibrous nanostructure (e.g., an SEM image); perform Fast Fourier Transform analysis on the image to obtain a radial summation of pixel intensity (converts image to frequency spacing); and perform oval-plot profiling (radial intensity is summed and plotted with respect to angle of acquisition to provide a curve (pixel intensity v. acquisition angle)). For nanostructures having aligned fibers, the curve is a peak (see, for example, FIGS. 2C and 3D) having a peak height. The measure or degree of alignment can be expressed as the ratio of peak height (PH) to peak width measured at half peak height maximum or full width at half maximum (FWHM) of the pixel intensity v. acquisition angle curve.

In certain embodiments, the fibrous structures of the invention have a degree of fiber alignment (defined as PH:FWHM) that is greater than or about 1:1. In other embodiments, the degree of fiber alignment is greater than or about 2:1, greater than or about 3:1, greater than or about 4:1, greater than or about 5:1, greater than or about 6:1, greater than or about 7:1, greater than or about 8:1, greater than or about 9:1, greater than or about 10:1, or greater than or about 20:1.

The following is a description of specific aligned fibers of the invention and methods for making and using the fibers.

The present invention provides a hybrid electrospinning system capitalizing on the fiber alignment mechanisms of both parallel-electrode method and centrifugal dispersion, that can produce highly aligned polymer fibers at large scale. The capability of the system is demonstrated using polyvinylidene fluoride (PVDF) as a model polymer. PVDF has favorable piezo-, pyro-, and ferro-electric properties and aligned PVDF fibers can be used for applications in actuators, transistors, textiles and composites. The versatility of the system is further demonstrated with two additional polymers, chitosan (a natural polymer) and polyethylene (a synthetic polymer), both of which have been shown in a wide range of applications in medicine, biotechnological and food industries.

Centrifugal Electrospinning System

The primary components of the centrifugal-electrode electrospinning (CE) system are a rotating hub hosting a spinneret (or syringe-needle) and an array of grounded plate electrodes that circularly surround the rotating hub (FIG. 1A). The spinneret powered by a high-voltage power supply dispenses the polymer solution while the grounded electrodes introduce a fringe electrostatic field facilitating fiber alignment when charged fibers are deposited across the gaps (i.e., collectors) between the neighboring electrodes (FIG. 1B). In addition to the alignment by electrostatic force, the solution jet gains additional momentum towards the direction of fiber alignment upon exit from the spinneret due to the centrifugal force created by the rotating spinneret. As the leading tip of a fiber deposited on an electrode, the fiber follows a continuous curvilinear path as continuously dispersed from the rotating spinneret with the trailing end deposited on the neighboring electrode, enhancing the fiber alignment. The length of the aligned fibers is defined by the width of the gap, and typically, fibers of a few inches in length can be readily produced (FIG. 1C).

Clearly, as with any electrospinning systems, the formability and characteristics of fibers for each polymer solution (type and concentration) are dependent on the system operating parameters, such as net charge density (or supplied voltage), width of electrode gap, and spinneret rotating speed (for our CE system). The following is a description of how these parameters affect the properties of electrospun fibers using PVDF as a model polymer system.

Spinneret Rotating Speed

In a conventional electrospinning process, polymer solution in the reservoir is electrostatically charged and when the applied electric field gradient overcomes the surface tension of the polymer solution, a Taylor cone forms at the tip and outside of the spinneret. The electrostatic force causes a solution jet to form at the tip of the Taylor cone and the solution jet elongates towards the collector, wherein the solvent evaporates, producing charged polymer fibers. In the CE system of the invention, a radial force created by centrifugal dynamics helps stretch the polymer solution that exits the spinneret tip. If the rotation speed of the spinneret is zero, the CE system is analogous to a traditional parallel-electrode configuration.

Figure 2A:
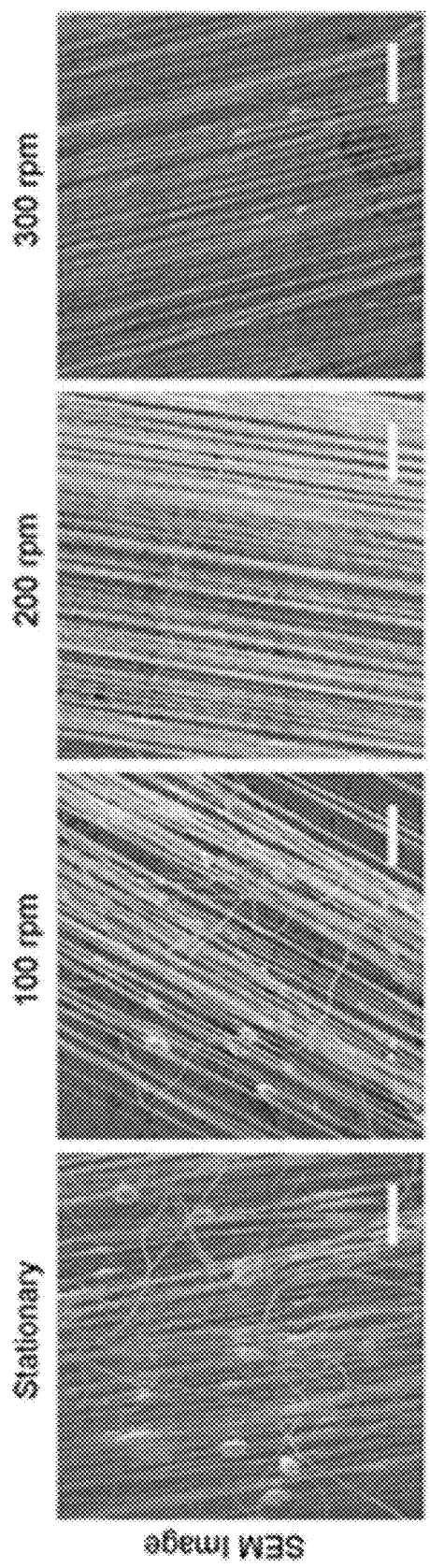
FIG. 2A compares SEM images of PVDF fibers (scale bars=20 µm) deposited across a 4-inch gap from a 20 wt % polymer solution electrospun at 12 kV and retrieved from a four-inch gap collector (spinneret stationary, 100 rpm, 2000 rpm, and 300 rpm).

To determine how the centrifugal dispersion affect the properties (diameter, uniformity and alignment) of electrospun fibers, a series of experiments with sequentially increased rotational speeds were used to dispense a 20 wt % PVDF solution. As shown in FIG. 2A, with a stationary spinneret (i.e., rotating speed=0), produced PVDF fibers were mostly aligned but misaligned fibers and a few beads were present. As the spinneret rotating speed increased, the degree of fiber alignment increased. At the spinneret rotating speed of 200-300 rpm, no apparent misalignment was observed. Further increase in the rotating speed resulted in decreased fiber yield, and at rotational speed of 400 rpm, no fibers could be collected, indicating that a too-high rotational speed would impede continuous fiber formation for the polymer solution used.

Figure 2B:
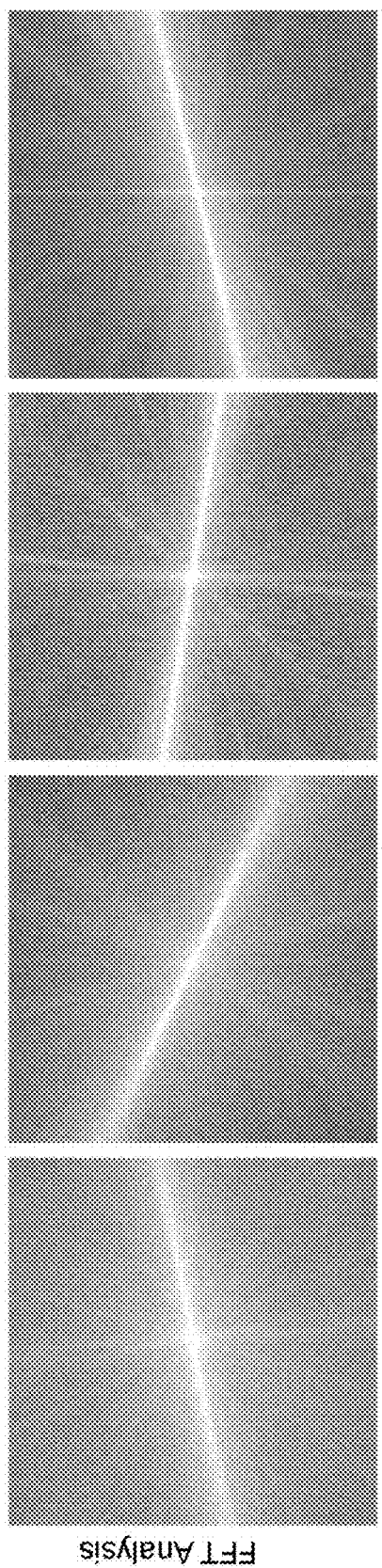
FIG. 2B is an FFT analysis illustrating the degree of fiber alignment.
Figure 2C:
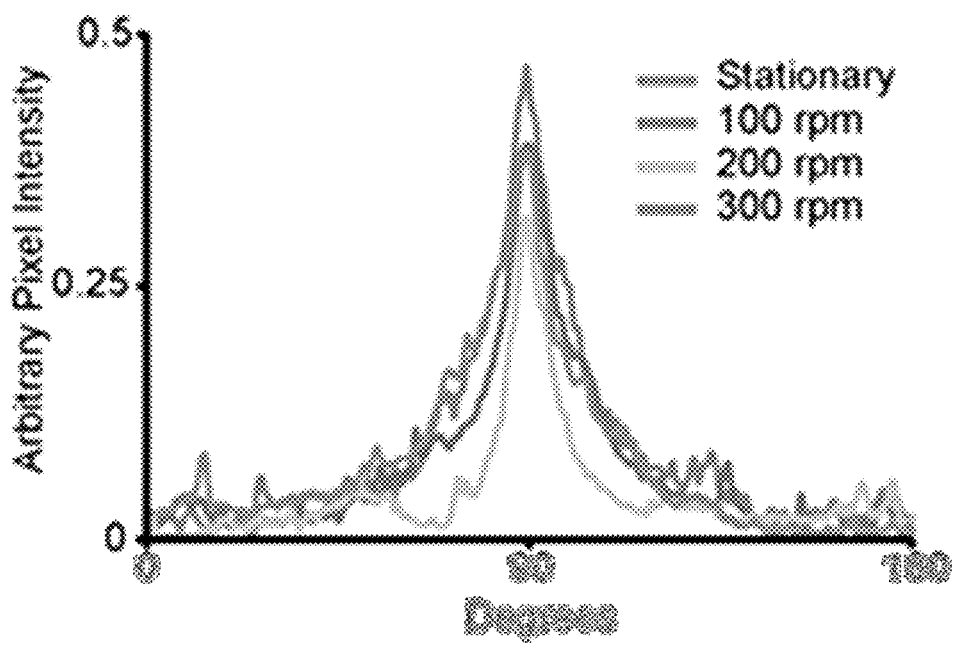
FIG. 2C illustrates arbitrary pixel intensity plotted from the radial summation of pixel intensity from the FFT analysis.

FFT analysis was performed on the SEM images to determine the relative degree of fiber alignment based on the conversion of the image into frequency spacing (FIG. 2B). A dispersed, randomly-oriented fiber sample exhibits a radially diffuse image in FFT analysis, while a highly aligned fiber sample exhibits a high intensity line normal to the fiber orientation. The FFT images were then analyzed with an oval-plot profile, wherein the radial intensity was summed and plotted with respect to the angle of acquisition. As shown in FIG. 2C, the fibers prepared at 200 rpm had the narrowest peak, with the smallest area underneath the curve, indicating that this rotational speed produced the highest degree of fiber alignment. Fibers produced from the stationary spinneret were least aligned.

In addition to the fiber alignment, the fiber morphology changed with the spinneret rotational speed. At zero or low (100 rpm) rotational speeds, a beads-on-a-string structure was observed. With stationary-spinneret dispersion, the high surface tension of the solution predominated the fiber formation, wherein the viscoelastic force in the solution resisted changes to the fiber jet shape, resulting in the beads-on-a-string structure. With increasing spinneret rotational speed, the fiber uniformity increased and the number of beads in the fiber mat was reduced. At 200 rpm, no beads were observed, indicating that the centrifugal force effectively overcame the surface tension. At a higher speed of 300 rpm, the degree of fiber alignment remained high, but a few beads reappeared. At an even higher speed (400 rpm), only beads were produced. The bead formation at these high rotational speeds was likely due to destabilization of the polymer solution by the increased centrifugal force, which might have prevented the formation of the Taylor cone and subsequent fiber formation. The destabilization occurs when the delivery rate of the solution to the spinneret tip was smaller than the rate at which the solution is removed by electrostatic and centrifugal forces, leading to non-continuous fiber formation.

Figure 2D:
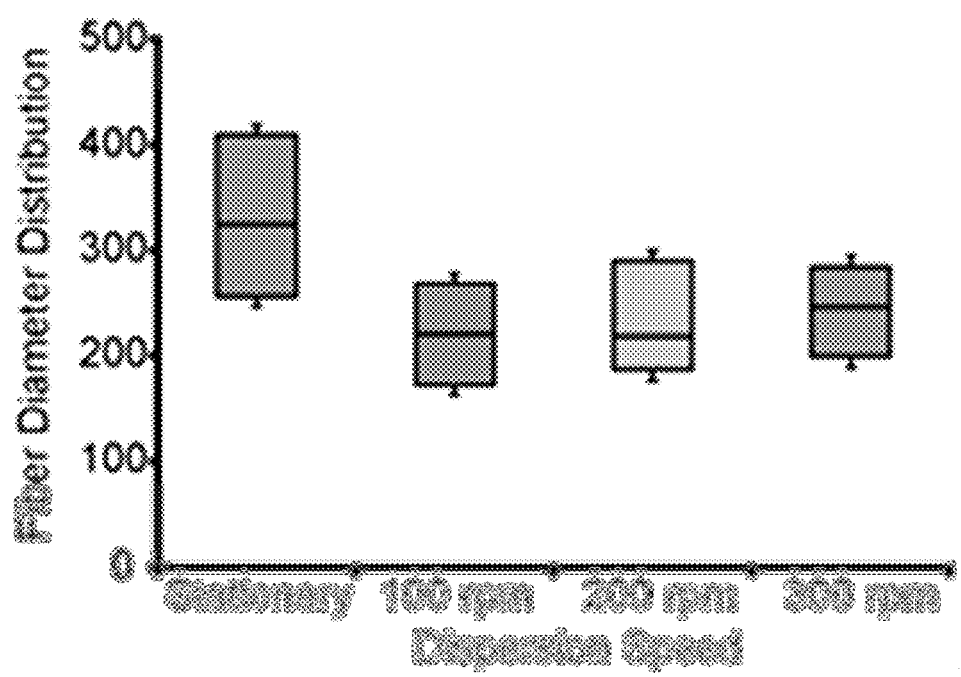
FIG. 2D compares fiber diameter distribution with the median diameter represented by the horizontal line shown in the middle of the bar. The error bars indicate the largest and smallest fiber diameters measured from a dataset of 50 fibers.

Notably, a decrease in fiber diameter was observed with increasing spinneret rotating speed (FIG. 2D). The diameter of fibers produced from the stationary spinneret was 345 nm and decreased to 224 nm at a spinneret rotating speed of 300 rpm. The decrease in fiber diameter was attributed to the enhanced elongation (and thinning) of the solution jet by the increased centrifugal force at the fixed solution-feeding rate. Based on these results, it was concluded that a spinneret speed of 200 rpm produces the most aligned, uniform and smallest diameter fibers from a 20 wt % PVDF solution.

Electrode Gap Width

Figure 3A:
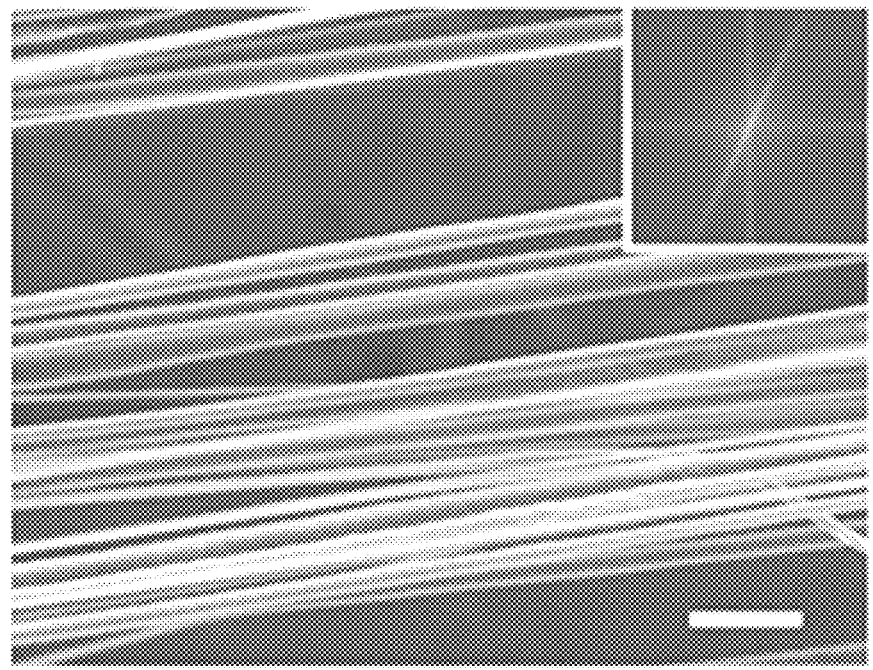
FIGS. 3A-3D illustrate the influence of electrode-gap width on PVDF fiber morphology. SEM images of the PVDF fibers from a 20 wt % polymer solution electrospun at 12 kV with a spinneret rotating speed of 200 rpm and retrieved from one-inch (FIG. 3A), four-inch (FIG. 3B), and six-inch (FIG. 3C) electrode gaps. The scale bars represent 2 µm. Insets in FIGS. 3A-3C are the FFT analysis illustrating the degree of alignment.
Figure 3B:
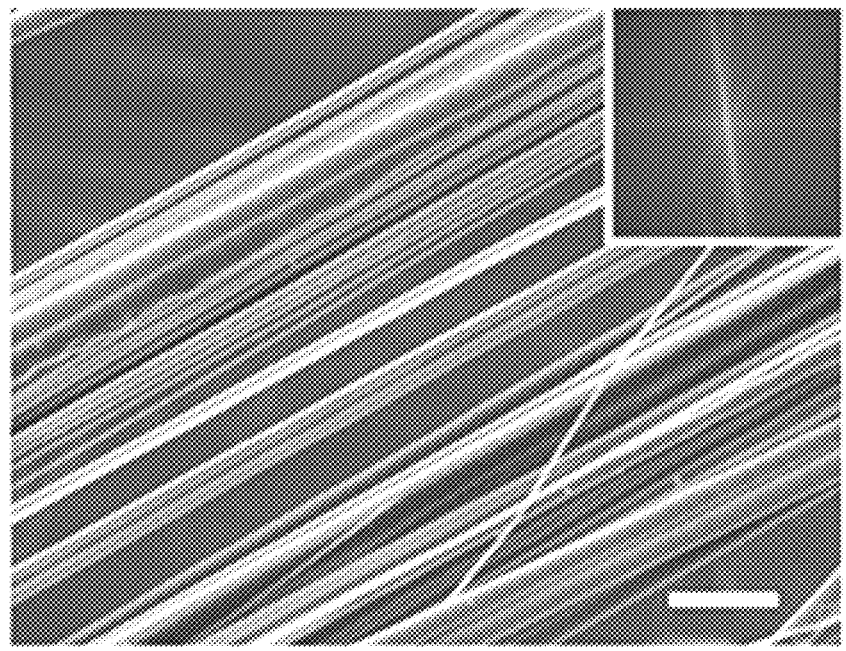
Figure 3C:
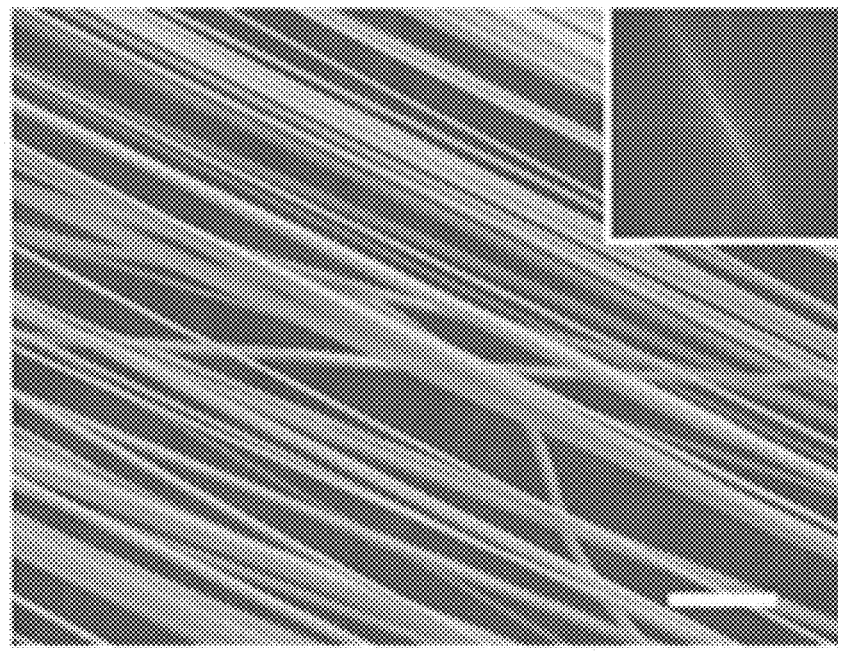
Figure 3D:
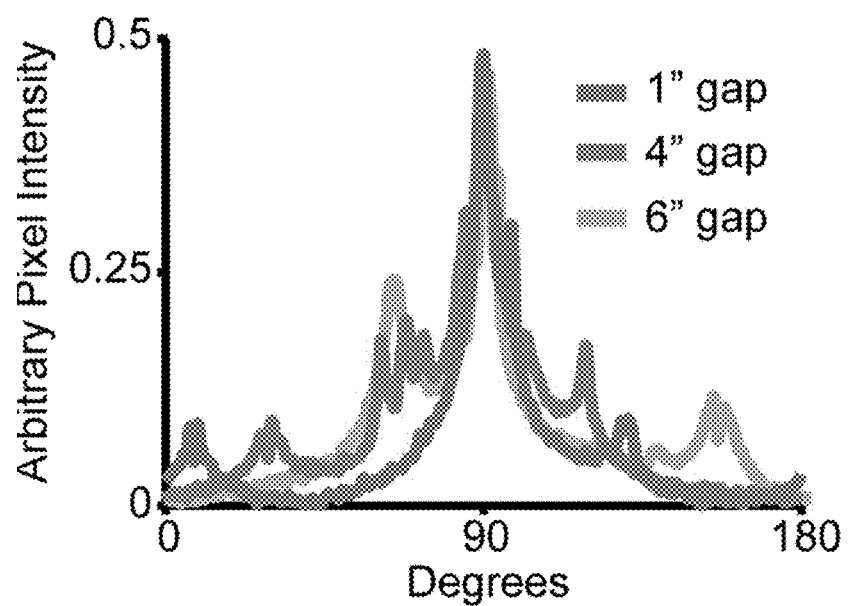

The parallel-electrode gap width has a significant impact on fiber alignment and dictates the ability of the CE system to produce long, aligned fibers. The electric field originates radially from the charged spinneret, directed towards the collector electrodes. Near the electrodes, the electric field lines bend in the horizontal direction, perpendicular to the electrodes. It has been demonstrated that the relative magnitude of this horizontal component of the field increases with increasing gap width, which favors the fiber alignment across the gap. However, there is a maximum electrode gap width within which the high-degree fiber alignment can be maintained. Above this maximum width, the degree of fiber alignment decreases due to reduced electric field strength that aligns charged fibers. As shown in FIG. 3, 20 wt % PVDF solution electrospun at 12 kV and 200 rpm spinneret rotating speed produced highly aligned fibers across both a one-inch and a four-inch gap (FIGS. 3A and 3B), but fibers were not as well aligned on the six-inch gap (FIG. 3C). This was further illustrated by FFT analysis (FIG. 3D). The four-inch electrode gap was thus chosen for further studies described below as it maintains good fiber alignment while producing long fibers.

Polymer Concentration

The viscosity of the solution affects the fiber formation, as well as the resultant fiber morphology and diameter. For a given polymer, the solution viscosity depends on solvent type and polymer concentration. There is a concentration range for each polymer for which continuous fibers can be produced. If the polymer concentration is too low, there is insufficient chain entanglement to form continuous fibers; conversely, if the concentration is too high, the resultant high viscosity and surface tension impede solvent evaporation and jet thinning, resulting in large fiber diameters.

Figure 4A:
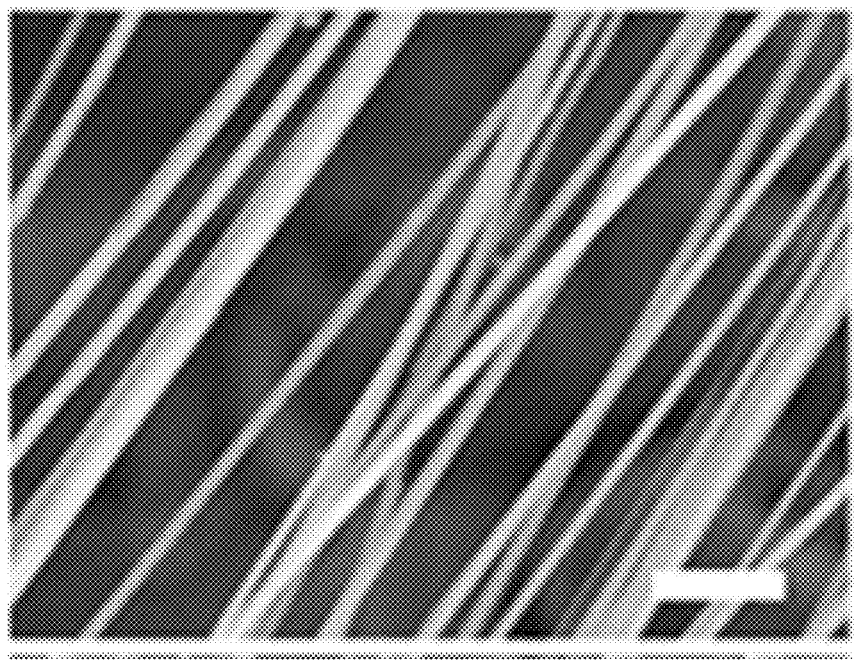
FIGS. 4A-4E illustrates the influence of polymer concentration on morphology of electrospun PVDF fibers. SEM images of fibers produced from 20 (FIG. 4A), 22.5 (FIG. 4B), 25 (FIG. 4C), and 27.5 (FIG. 4D) wt % PVDF in DMF/acetone. The scale bars represent 2 µm. The PVDF solutions were electrospun at 12 kV and 200 rpm, and the fibers were collected from a four-inch electrode gap.
Figure 4B:
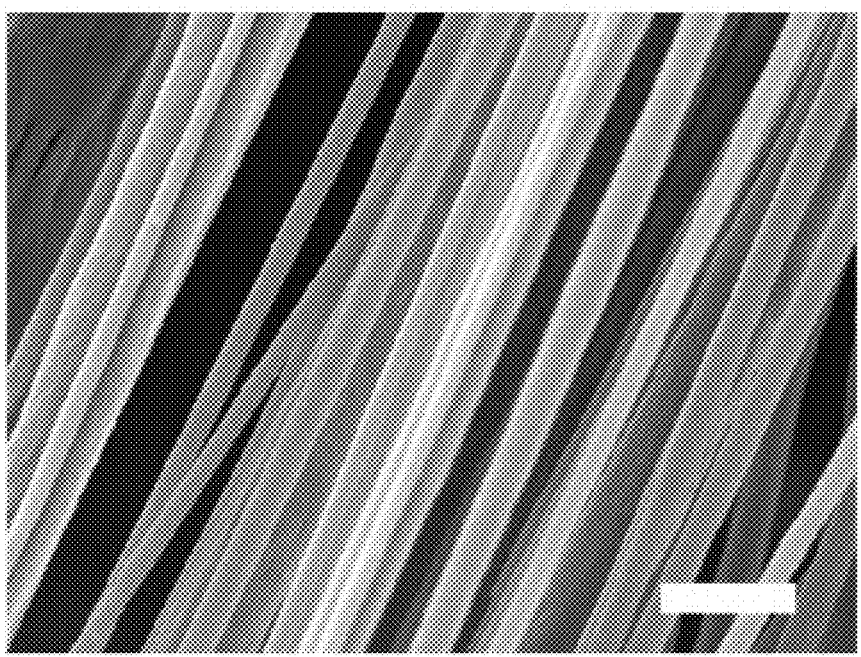
Figure 4C:
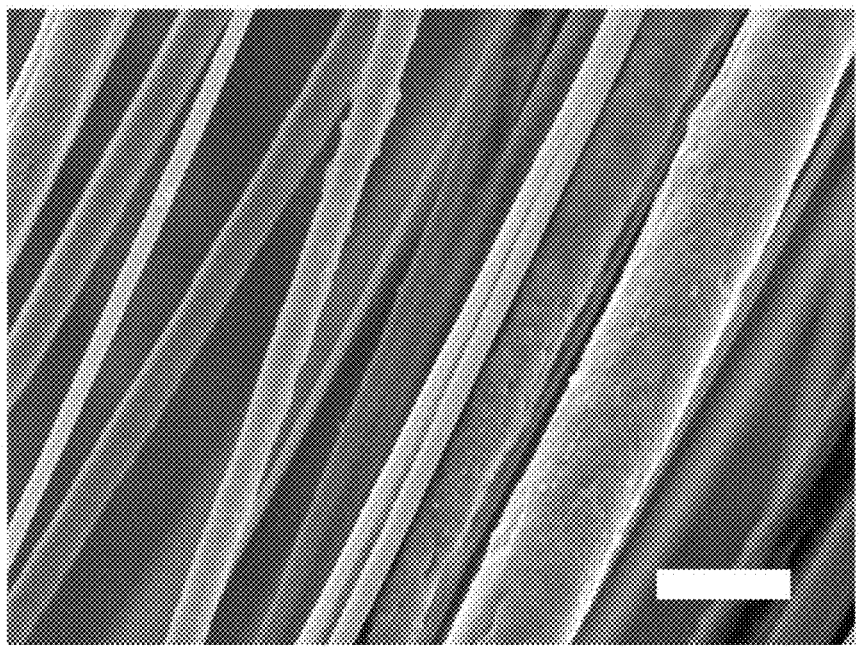
Figure 4D:
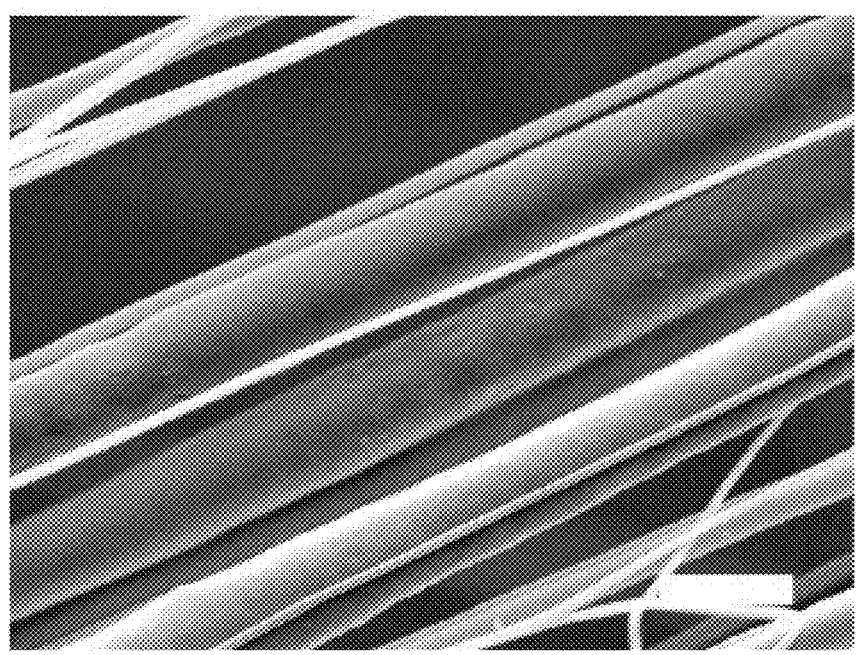
Figure 4E:
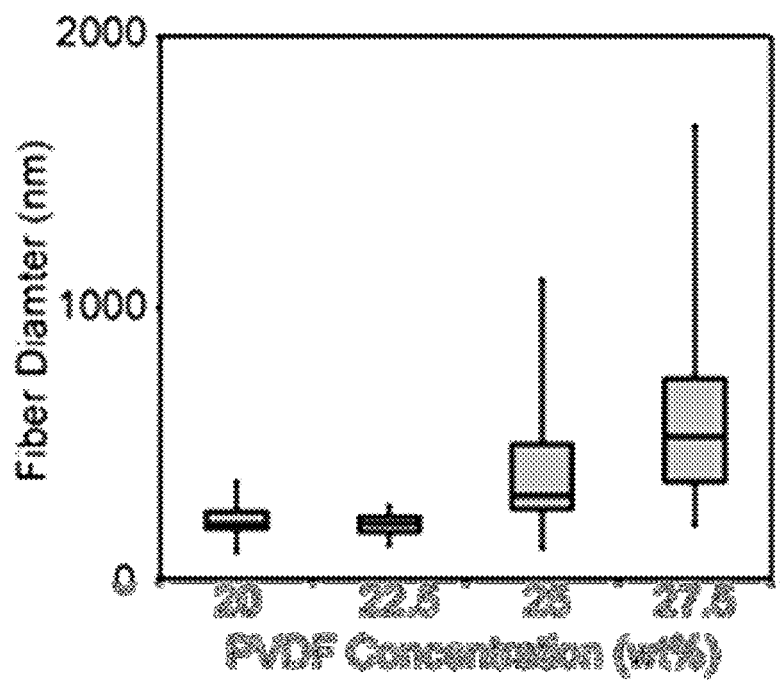
Figure 5A:
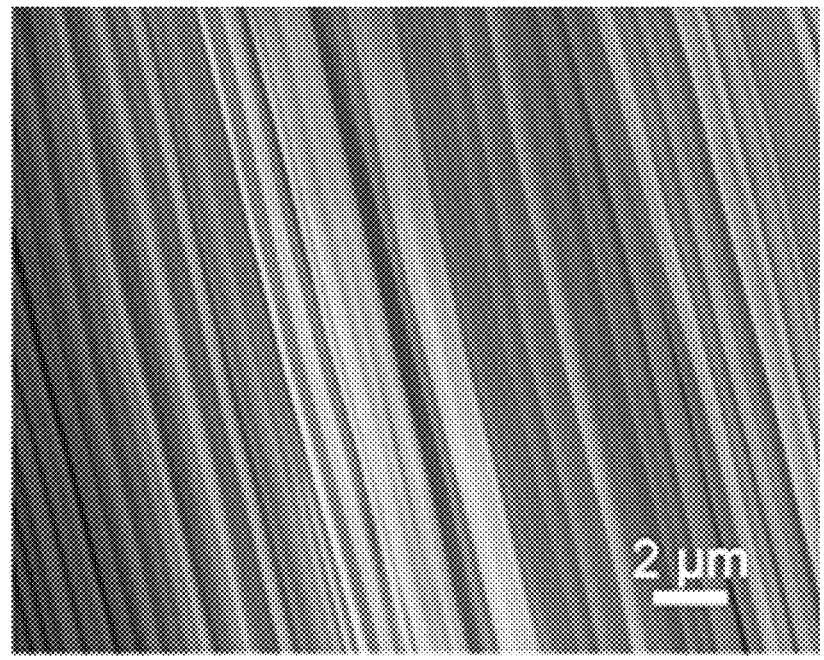
FIGS. 5A and 5B illustrate highly aligned PVDF fibers produced by a representative CE system of the invention with a 20 wt % polymer solution at 15 kV and 225 rpm.

PVDF solutions with polymer concentrations in 20-27.5 wt % were electrospun and evaluated. As shown in FIG. 4, the fiber diameter and non-uniformity increased as the polymer concentration increased; the 20 wt % and 22.5 wt % PVDF solutions yielded more uniform fibers with smaller diameters (FIGS. 4A and 4B) than 25 wt % and 27.5 wt % solutions (FIGS. 4C and 4D). For applications where the smallest diameters (thus the greatest surface area-to-volume ratio) are preferred, the optimal PVDF concentration range was 20-22.5 wt % for a spinneret rotating speed of 225 rpm. With the operating parameters chosen from the above investigations, highly aligned PVDF fibers were produced from a 20 wt % PVDF solution (FIG. 5).

Well-aligned nano-architectures are required in many engineering and biomedical applications to develop sophisticated electrical, chemical or biological devices. Several approaches have been used to modify the collectors of electrospinning systems in order to produce aligned fibers. A conventional parallel-electrode electrospinning system can produce fibers with a high degree of alignment, but only over a small area. A centrifugal dispersion system, on the other hand, can produce fibers over a large area, but the degree of fiber alignment is limited. The present invention provides a new approach to the electrospinning and demonstrates the fabrication of highly-aligned and uniform fibers over a large area (with fiber length up to several inches).

It is appreciated that the principle and methodology in the CE system setup of the present invention has been illustrated and that system parameters, such as supplied voltage, electrode (collector) gap width, spinneret or deposition electrode rotating speed, distance between the spinneret and collector, polymer and/or ceramic and/or active material concentration in electrospinning solution, and electrospinning solution-feeding rate, can be modulated to provide fibrous structures of the invention having desired properties. The CE system of the invention provides the flexibility to readily adjust the system parameters. For example, collector gaps between the grounded electrodes in the system can be set to different widths so that the effect of the electrode gap width on the fiber production and properties can be revealed by a single run.

The following examples are provided for the purpose of illustrating, not limiting, the invention.

EXAMPLE

Example 1

Fiber Preparation and Characterization

In this example, the preparation and characterization of representative fibers useful in the methods of the invention is described.

Centrifugal Electrospinning System Setup

The centrifugal electrospinning (CE) system includes a syringe-needle-spinneret positioned on a rotating hub driven by a variable speed electric motor (Amtek, Monrovia, Calif.). The spinneret is connected to a A30, 30 kVdc voltage power supply (Ultravolt, Ronkonkoma, N.Y.) and centered in a non-conductive cylindrical housing with a diameter that can be varied from 2 to 4 feet. Eight aluminum plates (electrodes), each attached to a grounded, 0.5 inch diameter aluminum rod, are secured to the non-conducting housing, concentrically surrounding the central hub (FIG. 1).

Polymer Solutions for Electrospinning

Polyvinylidene fluoride tetrafluoroethylene and polyvinylidene fluoride (PVDF) (Arkema Corporation, King of Prussia, Pa.) were mixed at a 70/30 weight ratio. The polymer mixture was dissolved in dimethylformamide (DMF)/acetone at a weight ratio of 60/40 to create final polymer concentrations between 20 and 27.5 wt %. To aid in the dissolution, the PVDF solution was refluxed at 80° C. for 30 min.

Centrifugal Electrospinning Setup Characterization

A 20 wt % PVDF solution was electrospun using a 25 gauge needle (0.26 mm ID), at a voltage of 12 kVdc, and a spinneret-collector distance of 20 cm. As a control, a low pressure of 0.1 psi was applied to the syringe to drive the flow of polymer solution which was electrospun without spinneret rotation to illustrate static dispersion and parallel electrode deposition. The same solution was then electrospun with the spinneret rotated at 100, 200, 300 and 400 rpm. To determine the influence of the polymer concentration on the fiber diameter, the PVDF concentration was varied between 20 and 27.5 wt % in the DMF/acetone solution. From these tests, a rotational speed of 200 rpm was chosen as the spinneret speed.

Fiber Characterization

Fibers were retrieved from the gaps of electrodes, sputter-coated with Au/Gd for 30 seconds at 18 mA, and imaged with a SEM (Joel JSM 7000F) at an operating voltage of 5 kV. Fast Fourier transform (FFT) was performed using ImageJ (NIH, Bethesda, Md., USA) on a representative image to determine the fiber alignment. Specifically, an image was uploaded into ImageJ software and FFT analysis produced a pixel intensity image based on the frequency and direction of the fibers. The FFT images were normalized to a vertical access with a baseline value of zero and radial pixel summing was performed using an oval profile plug-in. The FFT data was plotted over 180° as the FFT image is symmetric about the horizontal axis.

To demonstrate the piezoelectric functionality of PVDF fibers, fibers were electrospun from a 20 wt % PVDF in DMF/acetone solution containing 3 wt % tetrabutylammonium chloride (TBAC), which increases the solution conductivity to increase the electrospinnability and effectively increases the β-phase formation to contribute to the piezoelectric effect. Samples were electrospun across a three-inch gap to form aligned fiber, and randomly-oriented fibers were collected from the collector plate. Samples were also retrieved from a stationary dispersion condition (without spinneret rotation) across the same four-inch gap to illustrate a conventional parallel-electrode configuration. The sample dimensions were 0.74 mm$^2$ by 25 mm long. The fiber specimens were encased in PDMS, forming a cantilever beam with exposed fibrous ends. The specimens were tested according to the schematic in FIG. 6A. Electrodes were connected to the exposed fibers via conductive silver epoxy and connected to an Agilent 34420A NanoVolt meter that transmits voltage data to a computer running LabVIEW software via a custom vi program. The fiber specimen/PDMS samples were clamped to a support mounted to a nanomechanical tester as described in D. Edmondson, N. Bhattarai, S. Jana, A. Kim and M. Zhang, *Appl. Phys. Lett.*, 2009, 94, 103101. The entire testing system was placed into a quiescence state for 120 seconds before initiating beam deflection of the sample. The cantilever beam was deflected at 9.70 mm/min for 30 seconds. Three separate samples were tested, the results averaged and normalized.

X-ray diffraction analysis was performed to determine the relative crystalline phases that contribute to the PVDF piezoelectric response. PVDF TBAC samples were prepared for using powder, film, and fibers in the form of random, stationary aligned (parallel-electrode) and centrifugally-aligned (200 rpm) configurations. All samples were immobilized on a silicon substrate to reduce background noise. A Bruker D8 Discover XRD system with general area detector diffraction systems was used to probe two theta range of 16-28. Analysis and plotting was performed with Jade software and plotted with relative intensities for direct comparison of the diffraction peak locations.

Example 2

Piezoelectric Properties of Representative PVDF Fibers

To demonstrate the significance of fiber alignment in practical application, the piezoelectric properties of PVDF fibers was examined. In a traditional piezoelectric application of PVDF, the piezoelectric effect is strongly dependent on the crystalline phase and content (α, β, γ, δ), and PVDF materials can be mechanically or thermally manipulated to induce crystalline changes. Electrospinning has been shown to induce poling of PVDF along the fiber length due to the strong electrical field and mechanical fiber stretching during the electrospinning process. The aligned fibers have been particularly favored for better piezoelectric response. Thus, highly aligned PVDF fibers prepared from the CE system of the invention were expected to produce a significant piezoelectric responses compared to those prepared by traditional electrospinning methods.

Figure 6A:
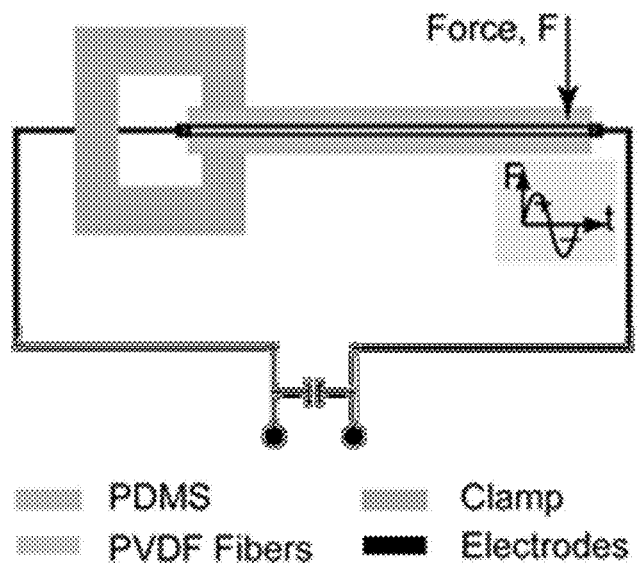
FIGS. 6A-6E illustrates the piezoelectric effect of PVDF fibers.

Aligned PVDF fibers were prepared across 3-inch electrode gaps at 15 kV of applied voltage and 200 rpm of spinneret rotating speed from a 20 wt % PVDF solution with 3 wt % tetrabutyl ammonium chloride (TBAC). For comparison, randomly-oriented fibers as well as aligned fibers produced by the parallel electrodes (spinneret rotational speed=0) were also prepared. All fiber samples were 25 mm long with a cross-sectional area of 0.76 mm$^2$. The samples were imbedded in PDMS, connected via electrodes to a voltage-output analyzer and clamped into a nanomechanical tester that could produce controlled strain rates (FIG. 6A). A common method to measure the piezoelectric response of fibers is through a mechanical bending test (see, for example, C. Chang, V. Tran, J. Wang, Y. Fuh and L. Lin, *Nano Letters*, 2010, 10, 726-731; X. Chen, S. Xu, N. Yao and Y. Shi, *Nano Letters*, 2010, 10, 2133-2137; and S.-H.

Figure 5B:
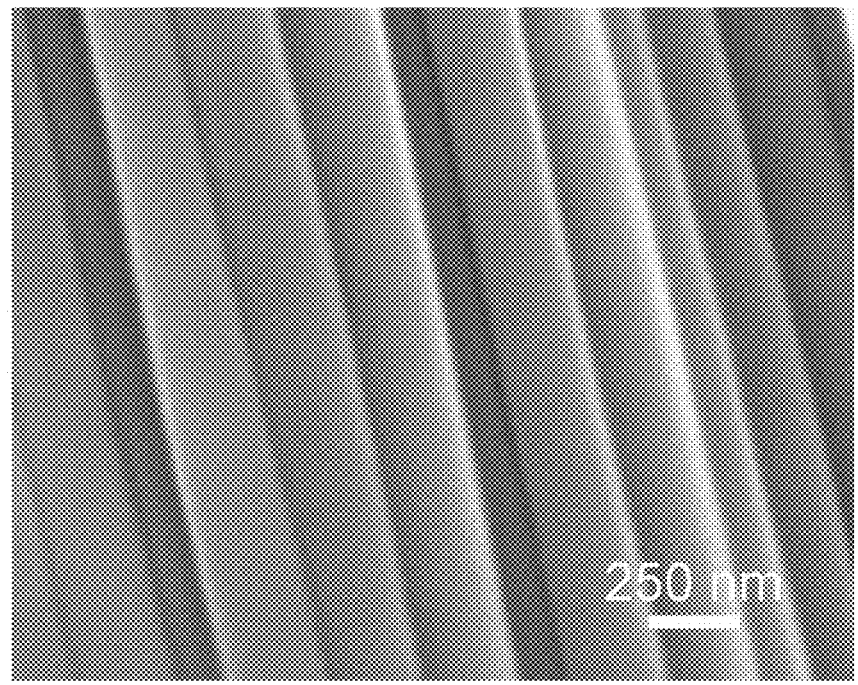
Figure 6B:
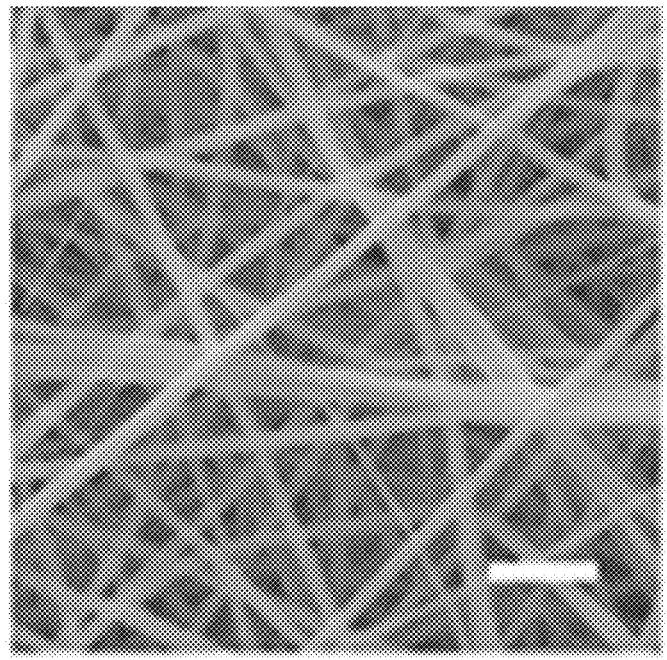
Figure 6C:
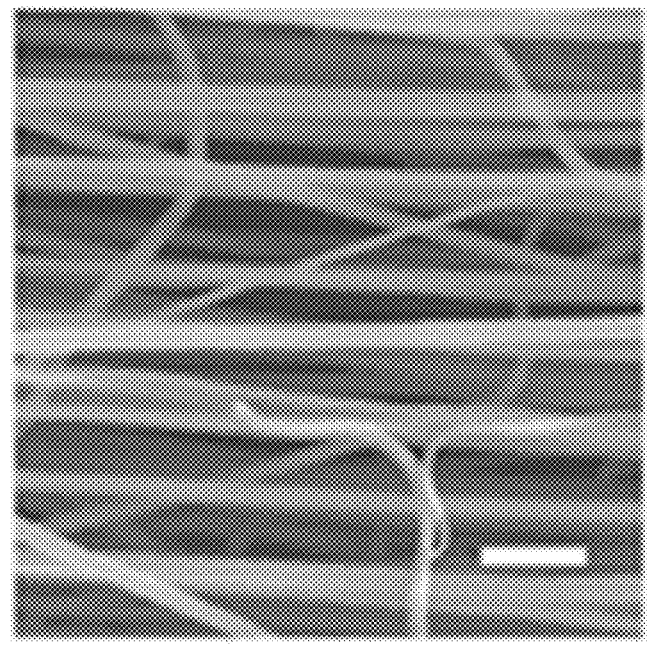
Figure 6D:
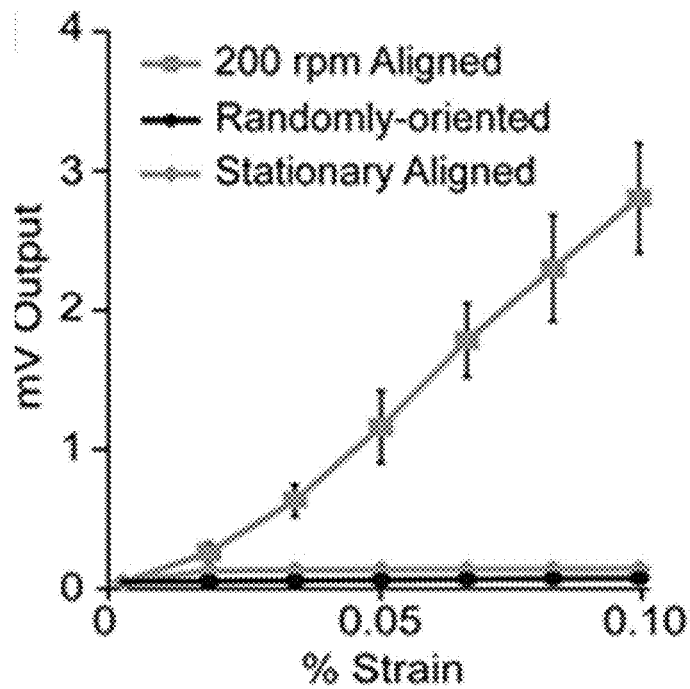

Lee, C. Tekmen and W. M. Sigmund, *Materials Science and Engineering: A*, 2005, 398, 77-81). The fiber/PDMS specimen was deflected in a cantilever motion at one end, which caused a bending strain across the cross-section of the sample and produced a measurable output voltage. As shown in FIG. 5B, the aligned fibers produced an output voltage of about 3.04 mV at the strain of 0.10 compared to the only 0.059 mV for the randomly-oriented fibers (FIG. 6C). Though the individual PVDF fibers in the randomly-oriented specimen were likely poled, the randomly-oriented poling directions in the membrane's bulk macrostructure (FIG. 6B) resulted in a negligible collective.

Importantly, the partially-aligned (FIG. 2) fibers produced by stationary dispersion (0 rpm, i.e., the parallel electrode method) representing the traditional parallel-electrode method produced 0.11 mV voltage outputs. The introduction of a centrifugal dispersion at 200 rpm enhances piezoelectric response by about 27 folds through fiber alignment and molecular poling alignment, demonstrating the promise of the CE technique to produce highly aligned, functional materials for a variety of applications.

Figure 6E:
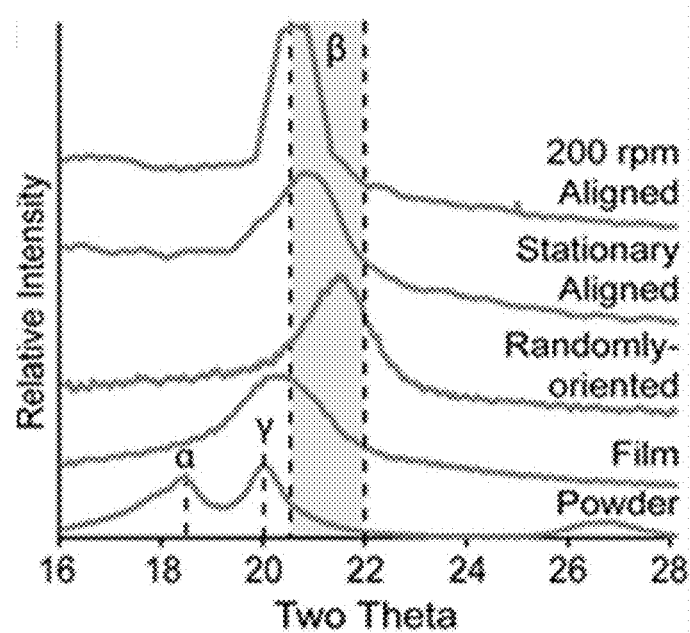

XRD analysis was performed to characterize the changes in crystalline phases, which correlate to the piezoelectricity of PVDF, by the introduction of the centrifugal dispersion force via the CE system. As shown in FIG. 6E, the original, as-received powder form of the PVDF material exhibited peaks at 18.5° and 20.3° are associate with the α- and δ-phases of PVDF. In the preparation of the electrospinning solution, PVDF and TBAC were dissolved in DMF/acetone solvent and refluxed at 80° C. To demonstrate the effect of the solvent and refluxing on the piezoelectric properties, a film sample was characterized with a single, diffuse γ-phase peak, which corroborates previous results of PVDF in DMF/acetone solution crystalline phases. With the introduction of the electrospinning force, β-phase peaks appear at 20-22°, as shown by the randomly-oriented fiber spectra, stationary-aligned and centrifugally aligned fibers. The high voltage applied to the electrospinning solution changes the molecular conformation of PVDF and the stretching of the polymer jets results in initial mechanical stretching, which causes nucleation of the β-phase. As all of the electrospun fibers, regardless of dispersion or collection methods, were composed of only the β-phase, there was no significant impact of the centrifugal dispersion on the polymorphism of PVDF. However, as the CE system of the invention produced more highly-aligned fibers than the traditional parallel-electrode method, the resultant PVDF fibers responses were enhanced due to the macroscopic anisotropy of the fibers which coincided with the β-phase polarity.

While illustrative embodiments have been illustrated and described, it will be appreciated that various changes can be made therein without departing from the spirit and scope of the invention.

The embodiments of the invention in which an exclusive property or privilege is claimed are defined as follows:

1. An electrospinning apparatus, comprising:
   (a) a nozzle configured to expel an electrospinning solution through a conductive tip to produce electrospun fibers;
   (b) a rotator configured to rotate the tip through a rotation plane; and
   (c) a plurality of deposition electrodes arranged in the rotation plane and configured to receive the electrospun fibers.

2. The electrospinning apparatus of claim 1, wherein the plurality of deposition electrodes are grounded.

3. The electrospinning apparatus of claim 1, wherein the plurality of deposition electrodes are arranged concentrically around the rotator.

4. The electrospinning apparatus of claim 1, wherein the plurality of deposition electrodes are separated by insulating gaps.

5. The electrospinning apparatus of claim 1 further comprising a power supply configured to apply a first voltage to the conductive tip.

6. The electrospinning apparatus of claim 1 further comprising a non-conducting housing enclosing the nozzle, the rotator, and the plurality of deposition electrodes.

7. The electrospinning apparatus of claim 1, wherein the nozzle is in liquid communication with a reservoir for the electrospinning solution.

8. The electrospinning apparatus of claim 1 further comprising a pressure source configured to apply pressure to the electrospinning solution and expel the solution from the nozzle.

9. The electrospinning apparatus of claim 1, wherein the conductive tip has a voltage of about 1 to about 30 kV DC.

10. The electrospinning apparatus of claim 1, wherein the plurality of deposition electrodes are from about 1 to about 24 cm from the conductive tip.

11. The electrospinning apparatus of claim 1, wherein the rotator is configured to rotate at about 50 to 1000 rpm.

12. An electrospinning apparatus, comprising:
   (a) a nozzle configured to expel an electrospinning solution through a conductive tip to produce electrospun fibers;
   (b) a plurality of deposition electrodes arranged in a rotation plane and configured to receive the electrospun fibers; and
   (c) a rotator configured to rotate the plurality of deposition electrodes through the rotation plane.

13. The electrospinning apparatus of claim 12, wherein the plurality of deposition electrodes are grounded.

14. The electrospinning apparatus of claim 12, wherein the plurality of deposition electrodes are arranged concentrically around the rotator.

15. The electrospinning apparatus of claim 12, wherein the plurality of deposition electrodes are separated by insulating gaps.

16. The electrospinning apparatus of claim 12 further comprising a power supply configured to apply a first voltage to the conductive tip.

17. The electrospinning apparatus of claim 12 further comprising a non-conducting housing enclosing the nozzle and the plurality of deposition electrodes.

18. The electrospinning apparatus of claim 12, wherein the nozzle is in liquid communication with a reservoir for the electrospinning solution.

19. The electrospinning apparatus of claim 12 further comprising a pressure source configured to apply pressure to the electro spinning solution and expel the solution from the nozzle.

20. The electrospinning apparatus of claim 12, wherein the conductive tip has a voltage of about 1 to about 30 kV DC.

* * * * *